United States Patent
Räsänen (10) Patent No.: US 6,563,789 B1
(45) Date of Patent: May 13, 2003

(54) DATA TRANSMISSION METHOD AND EQUIPMENT

(75) Inventor: Juha Räsänen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/269,156

(22) PCT Filed: Sep. 2, 1997

(86) PCT No.: PCT/FI97/00514

§ 371 (c)(1),
(2), (4) Date: Apr. 5, 1999

(87) PCT Pub. No.: WO98/10569

PCT Pub. Date: Mar. 12, 1998

(30) Foreign Application Priority Data

Sep. 3, 1996 (FI) ................................................. 963455

(51) Int. Cl.⁷ ............................................... H04L 1/00
(52) U.S. Cl. ....................................... 370/230; 370/235
(58) Field of Search ................................ 370/230, 231, 370/235, 242–244, 246–253, 310, 315–316, 351, 395.2, 449–454, 471, 473–476, 509, 522, 528, 467; 375/222; 455/9, 14

(56) References Cited

U.S. PATENT DOCUMENTS

| 5,054,020 A | | 10/1991 | Meagher | |
|---|---|---|---|---|
| 5,099,517 A | | 3/1992 | Gupta et al. | |
| 5,268,934 A | | 12/1993 | Sharma et al. | |
| 5,412,660 A | * | 5/1995 | Chen et al. | 370/318 |
| 6,292,496 B1 | * | 9/2001 | Rasanen | 370/305 |

FOREIGN PATENT DOCUMENTS

| FI | 955496 | | 5/1997 |
|---|---|---|---|
| FI | 955497 | | 5/1997 |
| WO | 97/18644 | * | 5/1997 |
| WO | 97/18660 | | 5/1997 |

OTHER PUBLICATIONS

Fernandes, "Enhanced Transmission of Data Over Common Channel Signalling No. 7 Links," Motorola Technical Developments, pp. 145–150, vol. 17, Dec. 1992.*

Williams Stallings, "Data and Computer Communications," pp. 179, Fifth Edition, 1996.*

Fernandes: "Enhanced Transmission of Data Over Common Channel Signalling No. 7 Links", Motorola Technical Developments pp. 145–150, vol. 17, Dec. 1992.

* cited by examiner

*Primary Examiner*—Chau Nguyen
*Assistant Examiner*—Nittaya Juntima
(74) *Attorney, Agent, or Firm*—Pillsbury Winthrop LLP (57) ABSTRACT

The invention relates to a data transmission method and equipment in a telecommunication system, particularly in a situation where the maximum data rate of a traffic channel is equal to one user data rate at a terminal interface. A mobile station inserts terminal interface status information in redundant parts of redundant user data elements of an end-to-end transmission protocol and sends them through the traffic channel without that the status information raises the data rate. If no user data elements are received at the terminal interface, auxiliary frames, in which the terminal interface status information can be transmitted, are generated. A mobile services switching centre separates the terminal interface status information from the redundant data elements or auxiliary frames at the receiving end.

13 Claims, 6 Drawing Sheets

| OCTET NO. | BIT NUMBER | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D37 | D38 | D39 | D40 | D41 | D42 | S8 |
| 8 | 1 | D43 | D44 | D45 | D46 | D47 | D48 | S9 |

V.110 FRAME

DATA TRANSMISSION METHOD AND EQUIPMENT

This application is the national phase of international application PCT/FI97/00514 filed Sep. 2, 1997 which designated the U.S.

FIELD OF INVENTION

The invention relates to data transmission in a telecommunication system, particularly in a case where the maximum data rate of a traffic channel is equal to one user data rate at a terminal interface.

BACKGROUND OF INVENTION

Mobile systems generally mean different telecommunication systems that enable private wireless data transmission for subscribers moving within the system. A typical mobile system is a public land mobile network PLMN. The PLMN comprises fixed radio stations (base stations) located in the service area of the mobile network, the radio coverage areas (cells) of the base stations providing a uniform cellular network. A base station provides a radio interface (air interface) in the cell for communication between a mobile station and the PLMN.

Another area of mobile systems includes satellite-based mobile services. In a satellite system, radio coverage is obtained by satellites instead of terrestrial base stations, the satellites being in orbit round the earth and transmitting radio signals between mobile stations (or user terminals UT) and land earth stations (LES).

Subscriber mobility requires similar solutions in satellite mobile systems as in the PLMNs, i.e. subscriber data management, authentication and location management of mobile subscribers, handover, etc. The satellite systems should also support similar services as the PLMNs.

One way of meeting the above requirements in satellite mobile systems is to use existing PLMN solutions. In principle this alternative is very straightforward since a satellite system can basically be compared to a base station system of a mobile system having a different radio interface. In other words, it is possible to use conventional PLMN infrastructure, where the base station system(s) is(are) a satellite system. In such a case, the same network infrastructure could, in principle, even contain both conventional PLMN base station systems and satellite 'base station systems'.

There are many practical problems, however, in adaptation of PLMN infrastructure and a satellite system. A problem apparent to the Applicant is that a PLMN traffic channel and a traffic channel of a 'radio interface' in a satellite system differ considerably. Let us examine an example where the PLMN is the pan-European digital mobile system GSM (Global System for Mobile Communication), and the satellite mobile system is the Inmarsat-P system currently developed.

At present, a GSM traffic channel supports data transmission at user rates 2400, 4800, 7200 and 9600 bit/s. In addition to user data, status information on the terminal interface (control signals of a V.24 connection) is transmitted in both directions on the traffic channel. In transparent HSCSD data service, it is also necessary to transfer synchronization information between subchannels. On the traffic channel is used channel coding to reduce the effect of transmission errors. The channel coding and the above-mentioned additional information increase the bit rate at the radio interface above the actual user rate. The user rates 2400, 4800 and 9600 bit/s are corresponded to by rates 3600, 6000 and 12000 bit/s at the radio interface.

The Inmarsat-P satellite system requires that standard data rates up to 4800 bit/s (e.g. 1200, 2400, 4800 bit/s) can be transferred on one traffic channel, and that standard data rates exceeding 4800 bit/s (e.g. 9600, 14400, 19200 bit/s, etc.) can be transferred by using several parallel traffic channels, like in the HSCSD service of the GSM system.

In the Inmarsat-P satellite system, the data rate of one traffic channel at the radio interface is at most 4800 bit/s, which equals the user data rate of 4800 bit/s at the terminal interface. In a data service employing two traffic channels the data rate at the radio interface equals the user data rate of 9600 bit/s at the terminal interface. A problem arises when not only the user data but also the above-described terminal interface status information and potential inter-subchannel synchronization information should be transferred over the radio interface. Therefore the protocol data unit, i.e. frame structure, used by the satellite system at the radio interface should be defined to carry the above-mentioned control and synchronization information over the radio interface. One way would be to use a GSM solution, i.e. a V.110-based frame structure, also at the radio interface of the satellite system. However, this would be a very complicated solution, and it would significantly reduce the user data rates available. A single traffic channel could not support the user data rate of 4800 bit/s since a V.110 frame structure and the terminal interface status information increase the actual data rate (radio interface rate) above 4800 bit/s. Therefore the highest standard user data rate on one traffic channel would be 2400 bit/s. For the same reason, a two-traffic-channel data service could not support the user rate of 9600 bit/s, but the highest standard user data rate would be 4800 bit/s (or in some systems 7200 bit/s). A corresponding decrease in the available data rates would also occur in data services employing more than two traffic channels. Such a solution, where the overhead information causes a significant loss of capacity, would not be satisfactory.

A similar problem can also arise when other types of radio interfaces, such as wireless telephone systems, are connected to the PLMNs.

A similar problem can also arise with other types of connections in which the radio interface rate is to be used as effectively as possible. For example, a new 14400 bit/s traffic channel has been planned for the GSM. In order that the status information of the terminal interface and any other control information could be transferred over the radio path in addition to the 14400 bit/s user data, the radio interface rate, implemented on the present principles, would be higher than 14400 bit/s, about 18 kbit/s. A higher radio interface rate requires that the existing radio networks should be re-designed and the intermediate rate (TRAU) increased so that only two subchannels could be put in a single 64 kbit/s timeslot in the HSCSD service (i.e. the efficiency decreases in a TRAU data link). The radio interface rate of 14400 bit/s does not cause such problems, but the actual user data rate would then be below 14400 bit/s, if the new traffic channel were implemented on the same principles as the existing GSM traffic channels. It would thus be preferable to implement a user data rate of 14400 bit/s at a radio interface rate of 14400 bit/s.

DISCLOSURE OF INVENTION

An object of the present invention is to provide a solution that supports transmission of user data, terminal interface status information and any other control or synchronization information through a transparent traffic channel having a data rate that is equal to the user data rate at the terminal interface.

The object of the invention is a method according to claim 1, and equipment according to claim 8.

In the present invention, the terminal interface status information and any other control or synchronization information are transferred through the traffic channel in redundant data elements of end-to-end protocols, e.g. in redundant parts of protocol data units of user data or in start and stop bits of asynchronous data characters. Overhead information does thus not increase the number of bits transmitted, so the data rate of the traffic channel can be equal to the user data rate at the terminal interface. In high-speed data transmission, a data connection may comprise a group of two or more traffic channels, whereby the overall data rate of the traffic channel group may be the same as the user data rate at the terminal interface.

Although the above solution usually works well, the operation can be optimized in situations where no user data elements of end-to-end protocols are present at the terminal interface and yet e.g. the status bits of the user interface have to be transferred through a traffic channel. These situations include, for example, call set-up, a pause in data transmission, and call set-down.

In the present invention, it is monitored at the transmitting end whether there are user data elements of the end-to-end protocol at the user interface. If user data elements of the end-to-end protocol are lacking and e.g. a change in the status information has to be sent, transmission of a bit stream through a traffic channel is interrupted, and specific auxiliary frames that carry the status bits and any other additional information are sent instead. At the receiving end, the status bits and other additional information are separated from the auxiliary frames and replaced with a suitable bit stream, which is supplied to the terminal interface. Simultaneously the terminal interface is monitored, and if new user data elements are received, the routine switches to an operating mode where the status bits and any other additional information are sent in the redundant parts of the user data elements. The type of the auxiliary frame can be selected specifically for each application, as long as both the transmitting end and the receiving end know what type of auxiliary frame is used.

BRIEF DESCRIPTION OF DRAWINGS

In the following the invention will be described by means of preferred embodiments and with reference to the attached drawings, in which.

PREFERRED EMBODIMENTS OF INVENTION

The present invention can be applied to data transmission through any traffic channel whatsoever, provided that the data rate of the channel is equal to the user data rate at the terminal interface. The traffic channel can be implemented by any multiple access technique, such as time division multiple access (TDMA) and code division multiple access (CDMA). The invention is obviously applicable in the new 14400 bit/s channel type of the GSM, the 9600 bit/s channel type of the CDMA, and the 4800 kbit/s channel type of the Inmarsat-P satellite system.

The preferred embodiments of the invention will be described below with reference to cooperation of a GSM-based mobile system and the Inmarsat-P satellite system connected to it as a 'base station system.' The invention, however, is not to be understood as being limited to these systems.

The structure and the operation of the GSM mobile system, defined in the GSM specifications of the ETSI (European Telecommunications Standards Institute), are well known to those skilled in the art. Reference is also made to *GSM System for Mobile Communication* by M. Mouly and M. Pautet, Palaiseau, France, 1992; ISBN:2-9507190-0-7. The GSM-based mobile systems include the DCS1800 (Digital Communication System) and the U.S. digital cellular system PCS (Personal Communication System).

Figure 1:
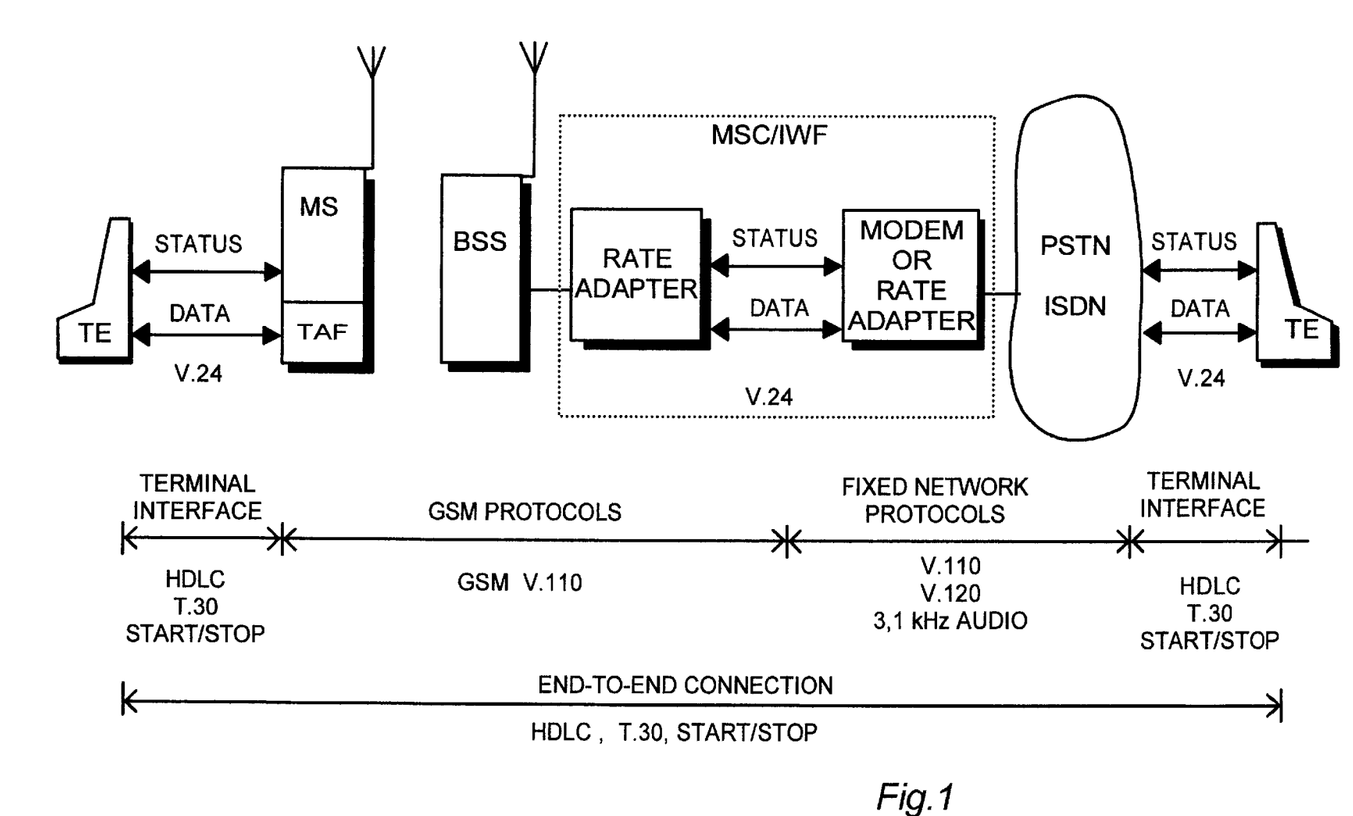
FIG. 1 is a block diagram illustrating a configuration for data transmission in accordance with the GSM recommendations.

FIG. 1 illustrates a configuration for data transmission according to the GSM recommendations. FIG. 1 shows the basic structure of the GSM mobile system. The GSM structure comprises two parts: a base station system BSS and a network subsystem NSS. The BSS and mobile stations MS communicate via radio connections. In the BSS, each cell is served by a base station BTS (not shown). A number of base stations are connected to a base station controller BSC (not shown), which controls the radio frequencies and channels used by the BTS. The BSSs are connected to a mobile services switching centre MSC. Certain MSCs are connected to other telecommunication networks, such as the public switched telephone network PSTN and the ISDN.

In the GSM system, a data connection is established between a terminal adaptation function TAF of an MS, and an interworking function IWF in the mobile network (usually in the MSC). In data transmission taking place in the GSM network, this connection is a V.110 rate-adapted, UDI-coded digital full-duplex connection that adapts to V.24 interfaces. The V.110 connection described herein is a digital transmission channel originally developed for ISDN (Integrated Services Digital Network) technology. It adapts to a V.24 interface. and also allows transmission of V.24 statuses (control signals). The CCITT recommendation for a V.110 rate-adapted connection is presented in the CCITT Blue Book: V.110. The CCITT recommendation for a V.24 interface is presented in the CCITT Blue Book: V.24. In non-transparent data services, a GSM connection also employs a radio link protocol RLP. The TAF adapts a data terminal TE connected to the MS to the above-mentioned GSM V.110 data connection, which is established over a physical connection utilizing one or more traffic channels (HSCSD). The IWF comprises a rate adapter that adapts the GSM V.110 data connection to a V.24 interface, and a data modem or another rate adapter depending on whether the connection is extended to the PSTN or the ISDN. The ISDN protocols may be, for example, V.110 or V.120. In the ISDN or the PSTN, the data connection is established, for example, to another data terminal TE. The V.24 interface between the MS and the TE is here called a terminal interface. A corresponding terminal interface is also found in the IWF, and for the other TE in the ISDN or the PSTN. The protocol used between the terminal equipments TE may be, for example, a HDLC protocol described in ITU-T recommendation X.25 or, in facsimile transmission, a protocol according to ITU-T T.30.

A GSM traffic channel supports data transmission at user rates 2400, 4800, 7200 and 9600 bit/s. In the future, high-speed data services (HSCSD=high speed circuit switched data) employing two or more traffic channels at a radio interface (multi-slot access) will also support higher user rates (14400 bit/s, 19600 bit/s, . . . ). In addition to user data, terminal interface status information (V.24 interface control signals), such as CT105 (RTS=request to send), CT108 (DTR=data terminal ready), CT106 (CTS=clear to send), CT107 (DSR=data set ready) and CT109 (CD=data carrier detect), is also transmitted in both transmission directions in V.110 frames. Further, in multichannel transparent HSCSD data service it is also necessary to transfer inter-subchannel synchronization information. The traffic channel employs channel coding that aims at decreasing the effect of transmission errors. The channel coding and the above-mentioned additional information increase the bit rate at the radio interface above the actual user rate. The radio interface rates corresponding to user rates 2400, 4800 and 9600 bit/s are 3600, 6000 and 12000 bit/s.

The frame structure used for data transmission over a V.110 connection is described in greater detail e.g. in the GSM recommendations, and in Finnish Patent Applications No. 955,496 and 955,497.

It should be noted that the status bits of the V.110 frame are only an example of terminal interface status information and other information that would normally have to be transmitted in V.110 frames or other frames through a traffic channel. It is not essential to the invention, however, what the status information or potential other control or synchronization information that is transmitted in addition to the user data actually contains. The invention is generally applicable to transmission of all such overhead information.

Figure 2:
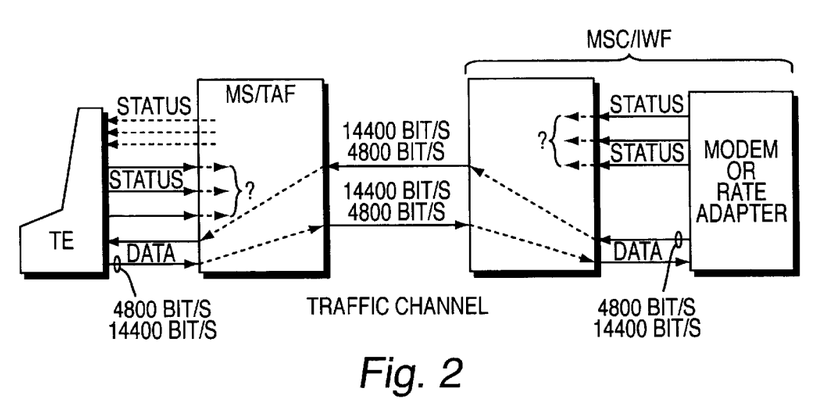
FIG. 2 is a block diagram generally illustrating the problem underlying the present invention, i.e. the problem of a traffic channel whose data rate is the same as the user data rate.

A GSM traffic channel thus has additional capacity for transmitting the necessary status and synchronization information, as well as the user data. Problems arise when the data rate of the traffic channel at the radio interface is equal to the user data rate at the terminal interface, e.g. 14400 bit/s or 4800 bit/s, as generally illustrated in the block diagram of FIG. 2. The traffic channel does not have any extra capacity that could be used for transmitting other information in addition to the 4800 bit/s of data. In practice, the user data rate of e.g. 4800 bit/s on the traffic channel would have to be reduced to 2400 bit/s.

Figure 3:
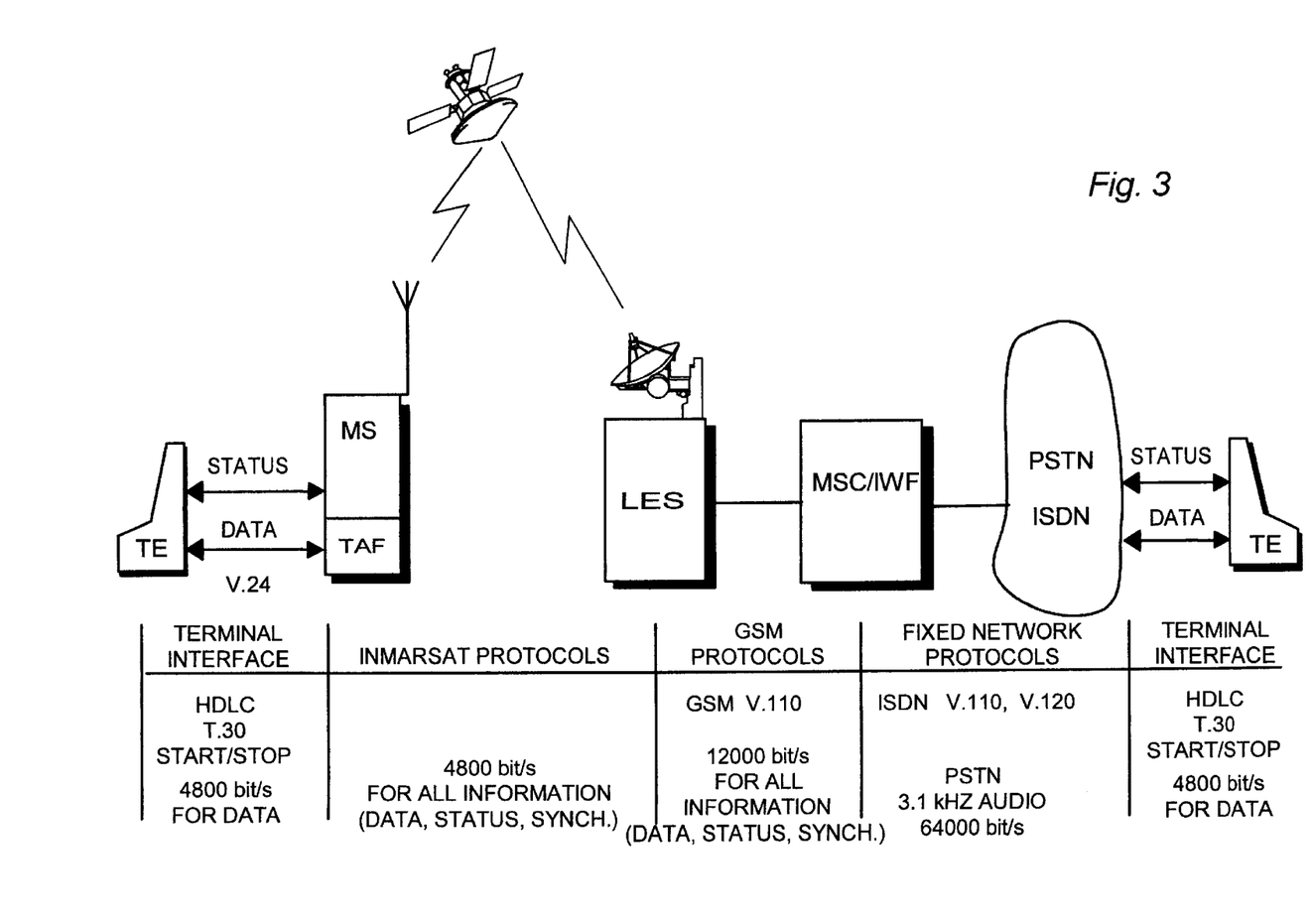
FIG. 3 is a block diagram illustrating connection of the Inmarsat-P satellite system as a base station system to a GSM-based mobile system.

FIG. 3 shows a GSM-based mobile system having the Inmarsat satellite system as a base station system. For the sake of clarity, only one land earth station LES, one satellite SAT and one mobile station MS (or user terminal UT) are shown in the figure. The land earth station LES is connected to the MSC of the GSM network in the same way as the base station subsystem BSS in FIG. 1. Also, the GSM protocols between the MSC and the LES are the same as between the MSC and the BSS in FIGS. 1 (GSM V.110). The terminal interface and its protocols (HDLC, T.30), and the protocols of the fixed network (ISDN V.110/V.120 or PSTN 3.1 kHz.audio) are also the same as in FIG. 1. The difference is that in FIG. 3 a GSM V.110 connection is not used over the entire connection MSC-MS, but the radio interface LES-MS uses Inmarsat protocols and traffic channels.

The radio interface consists of a bidirectional satellite radio connection between a mobile station MS and a land earth station LES. The exact structure or operation of the units SAT, LES and MS in the satellite system, or the exact specifications of the radio interface, are not relevant to the present invention. The invention does not require any changes in the actual satellite system, the details of which can be obtained from the Inmarsat specifications. The only feature essential to the invention is the capacity of the traffic channel formed over the radio interface. The maximum data rate of a traffic channel in the Inmarsat-P system is 4800 bits/s, which causes the problem generally described in connection with FIG. 2: the terminal interface statuses cannot be transmitted through the traffic channel when the user data rate is 4800 bits/s.

The object of the present invention is to transmit terminal interface status information and any other control or synchronization information through a traffic channel in redundant data elements of end-to-end protocols, e.g. in redundant parts of protocol data units of user data, or in start and stop bits of asynchronous data characters.

Finnish Patent Applications 955,496 and 955,497 by the same Applicant, incorporated herein by reference, teach a synchronous and, respectively, an asynchronous data transmission method in which the above-described principle can be utilized and the present invention applied.

In Finnish Patent Application 955,496, terminal interface status information and any other control or synchronization information are transferred through a traffic channel in redundant parts of the protocol data units of the transmission protocol(s) currently used. At the receiving end the status information and any other information are separated from the protocol data units, and the original redundancy is restored to the protocol data units. The basis of the synchronous transmission is that the frame structures of many transmission protocols comprise redundant bits when they are used in the PLMN environment, e.g. in the GSM network, or as a result of repetition occurring in them, or for some other such reason.

For example, the bearer services of the PLMN networks use an point-to-point connection, i.e. a circuit-switched connection is used between two points. Most transmission protocols are also meant for point-to-multipoint connections, in which case their frame structure comprises an address field. The address field is redundant on a point-to-point connection. The terminal interface status information and any other control or synchronization information are transferred in such an address field. The protocols include, for example, HDLC (high level data link) based protocols.

A synchronous facsimile protocol according to GSM recommendation 03.45 uses a HDLC frame comprising a redundant address field at a binary coded signalling stage and at an error-corrected facsimile data transmission stage. It also comprises other stages in which GSM specific frames are sent. These frames contain redundancy in the form of repetition of the same information.

If the facsimile service uses a normal facsimile data mode NFD according to ITU-T T.30, the data contains end-of-line chains (EOL), facsimile-coded data, and possibly stuffing data to make up the minimum line length. The stuffing can be considered redundant in respect of the transmission.

Figure 4:
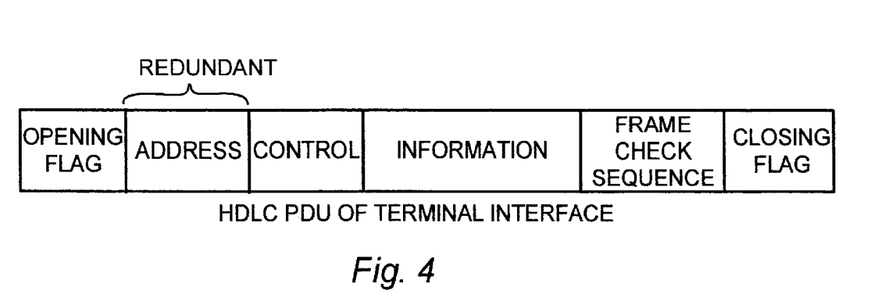
FIG. 4 shows a standard HDLC frame.
Figure 5:
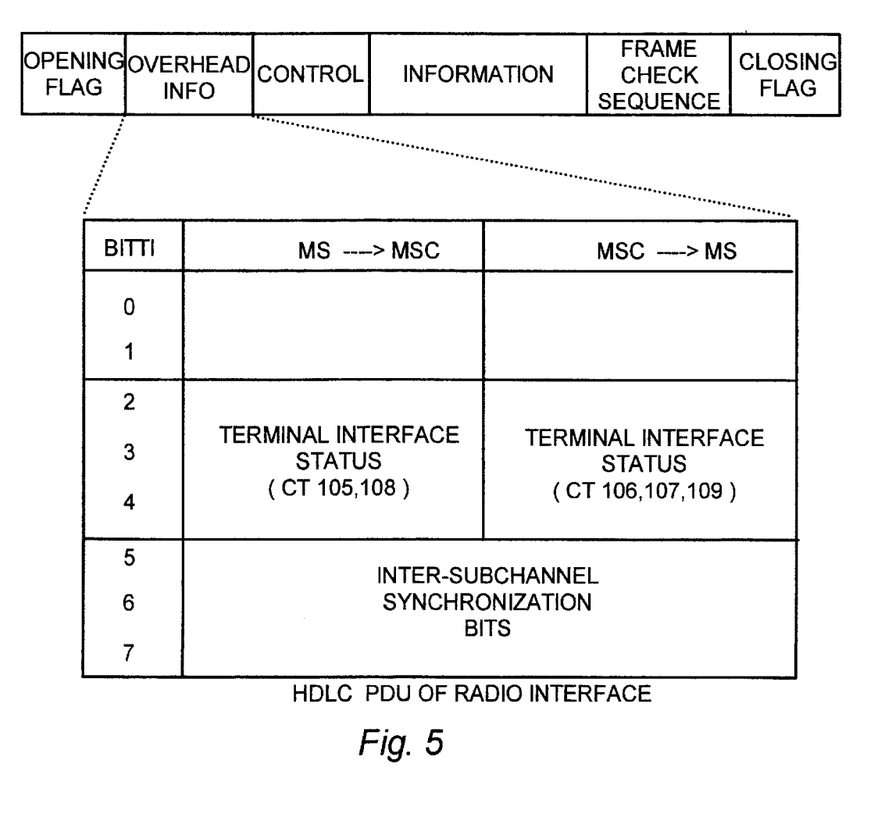
FIG. 5 shows a modified HDLC frame.

With reference to FIGS. 4 and 5, we shall now describe, by way of example, how the address field of a HDLC-based protocol, which is redundant in a point-to-point environment (such as GSM), can be utilized in the present invention. Other protocols are described in greater detail in Finnish Patent Application 955,496.

The HDLC is an ITU-T X.25 link layer protocol, and its standard frame structure is shown in FIG. 4. This is thus the PDU of the terminal interface, shown in FIG. 4, and the redundant part therein is the ADDRESS field. FIG. 5 shows the HDLC PDU of the radio interface, in which overhead information according to the invention is transmitted in a redundant ADDRESS field. More specifically, three bits of the 8-bit ADDRESS field (e.g. bits 2, 3, 4) are used for transmitting the terminal interface status information (CT105, 108 in the direction MS_MSC, and CT106, 107 and 109 in the direction MSC-MS), and three bits (e.g. bits 5, 6, 7) are used for transmitting inter-subchannel synchronization bits in the HSCSD service.

Figure 2A:
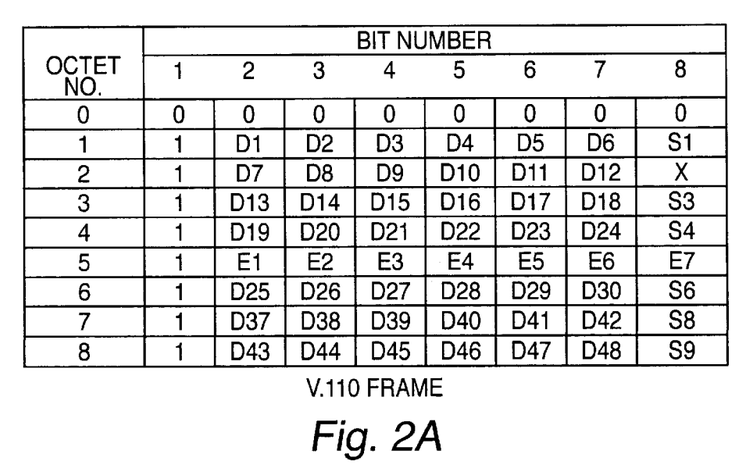
FIG. 2a is a block diagram including the V.110 frame.

The MS sends the PDU of the radio interface through a satellite to the land earth station LES. The LES separates the terminal interface status information and any intersubchannel synchronization information from the received PDU of the radio interface. The original redundancy of the PDU can be restored a) by restoring the original redundant information, if it is known, b) by retaining the information added by the MS/TAFs, or c) by inserting other arbitrary information in the redundant parts REDUNDANT. The LES then inserts the PDU and the overhead information according to the invention in the V.110 frame according to FIG. 2a. More specifically, the LES inserts the content of the PDU in data bits D1–D48 of the V.110 frame, and in status bits S1–S9 of the terminal interface, and potential intersubchannel synchronization information e.g. in bits S1, S3, and X, as described above in connection with FIG. 2a. The V.110 frame is then forwarded to the MSC.

In the opposite transmission direction MSC-MS, the procedure is reversed, and it is described in greater detail in Finnish Patent Application 955,496.

In Finnish Patent Application 955,497, transmission of terminal interface status information and any other control or synchronization information is based on synchronous-asynchronous conversion, which is needed at the transmitting end when asynchronous characters are transmitted through a synchronous traffic channel. The conversion defines rate adaptation, underrate processing, and overrate processing. Underrate processing means that extra stop bits STOP are added between asynchronous characters before transmission. Overrate processing means that STOP bits are removed now and then from between the asynchronous characters before transmission. This kind of conversion is defined e.g. in ITU-T recommendation V.14, which also determines the underrate and overrate.

The conversion can be used for transmitting overhead information of the terminal interface by concatenating asynchronous characters to form longer 'protocol units' and by removing the START bits and STOP bits from between the concatenated characters. The capacity made available by the removal of start and stop bits is used for transmission of status information. Standard underrate and overrate processing and rate adaptation are applied to the new protocol data unit PDU. The protocol data units are transmitted over a synchronous traffic channel to a receiver. The receiver synchronizes with the START bits and performs operations that are reverse to those performed by the transmitter. In other words, the receiver separates from the protocol data unit asynchronous data characters, terminal interface status information, and any other control or synchronization information.

Figure 6:
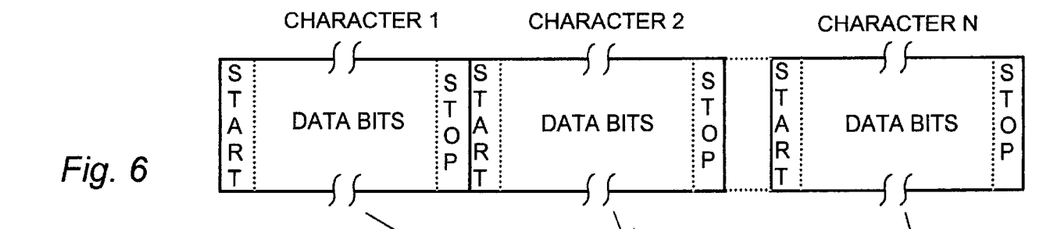
FIG. 6 shows a common asynchronous character sequence.
Figure 7:
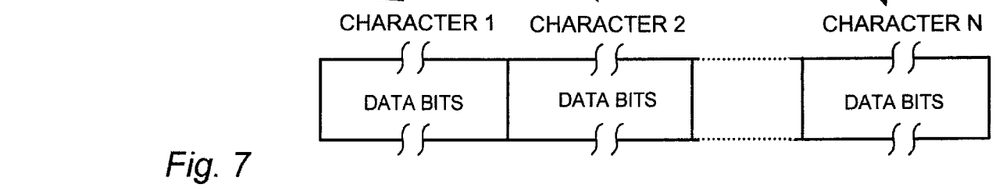
FIGS. 7 and 8 illustrate formation of a protocol data unit transmitting status information.
Figure 8:
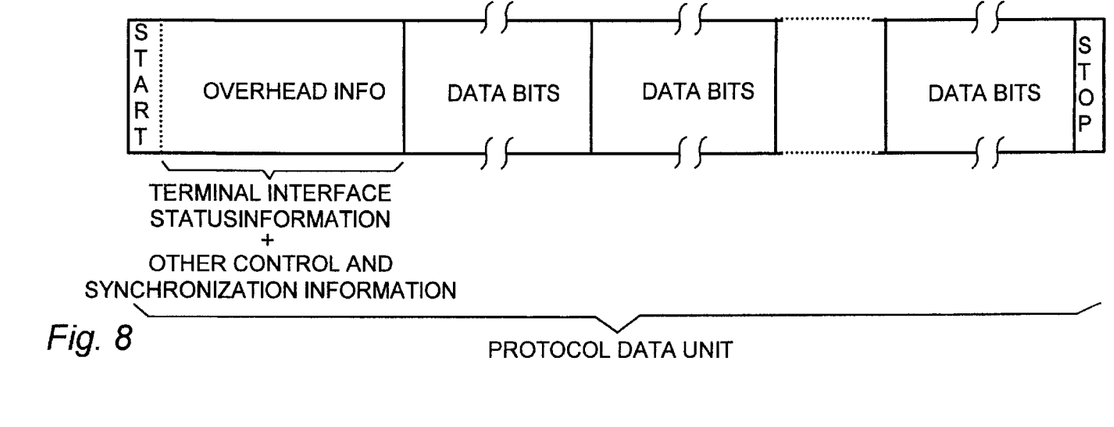

With reference to FIGS. 6 to 8, we shall now describe how status information of a V.24 terminal interface and any other control or synchronization information can be transmitted utilizing the above-described asynchronous-synchronous conversion.

Let us first study the uplink direction from the mobile station MS to the land earth station LES. At first the MS receives the status signals and asynchronous characters according to FIG. 6 from the terminal interface. The MS removes as many START bits and STOP bits from between the asynchronous characters 1–N as allowed by the specifications of the asynchronous-synchronous conversion used. Bit positions are thus freed (the data rate of the payload signal is reduced) to allow addition of overhead information. The MS then concatenates asynchronous characters 1–N, which lack START and STOP bits, according to FIG. 7. After this, the terminal interface status information and any other control or synchronization information, so-called OVERHEAD INFO, are concatenated with these concatenated data characters. The number of overhead information bits is such that they can be transmitted by the transmission capacity made available by the removal of START and STOP bits. The concatenated asynchronous data characters, the status information, and any other control or synchronization information are given a common START bit and a common STOP bit, whereby a new protocol data unit PDU according to FIG. 8 is formed. The standard underrate and overrate processing are applied to this PDU in the same way as to a single data character. In other words, STOP bits can be removed from between the protocol data units PDU according to FIG. 8, or extra START bits can be added there. Also, standard rate adaptation is applied to the new protocol data unit PDU, i.e. STOP bits can be added between the protocol data units. The MS sends the processed protocol data units PDU through a synchronous traffic channel or a group of synchronous traffic channels of a satellite system (through a satellite SAT) to the land earth station LES.

The land earth station LES synchronizes with the START bits and performs operations that are reverse to those performed by the mobile station. In other words, the land earth station LES separates the asynchronous data characters and OVERHEAD information (terminal interface status information and any other control or synchronization information) from the protocol data unit PDU according to the invention. The LES then adds START and STOP bits to the data characters and adapts the data characters, as well as the status information and any other control or synchronization information, to a V.110 frame. More specifically, the data characters are inserted in data bits D1–D48, and the status and other information in bits S and X. The LES sends the V.110 frame to the mobile switching centre MSC using GSM protocols and traffic channels.

In the opposite transmission direction MSC-MS (downlink), the procedure is reversed, and it is described in greater detail in Finnish Patent Application 955,497.

In high rate transmission using a multi-channel connection, the other control or synchronization information contains inter-channel synchronization information. The MSC uses the information for restoring the order of the data bits received from different channels. In high rate data transmission, a data connection may comprise a group of two or more traffic channels, whereby the overall data rate of the traffic channel group may be the same as the user data rate at the terminal interface.

In the above examples, status information is transmitted in a traffic channel section between the satellite land earth station LES and the mobile station MS. The same procedures can also be used over the entire traffic channel between the MS/TAF and MSC/IWF in accordance with FIG. 2. This is particularly suitable for a GSM 14400 bit/s traffic channel. In the description below, the invention will be described using a configuration according to FIG. 1 as an example.

Solutions of the above type, however, do not operate optimally in situations where user data elements of end-to-end protocols are not available at the terminal interface, and yet e.g. terminal interface status bits have to be transmitted through a traffic channel.

The above situations include, for example, the following:
1) Status bits cannot be sent when a traffic channel is being set up between the TAF and the IWF, since the status bits are assumed to be transferred in redundant user protocol elements, and no user protocol units whatsoever are necessarily transmitted at the call set-up stage. An example is an asynchronous modem call where data is to be sent to the PSTN:
   i) a call is set up,
   ii) the modem of the IWF shakes hands with the modem of the PSTN.
   iii) modem statuses CT107 and CT109 should be sent to the TAF of the MS so that the MS could send data,
   iv) no user data is received from the PSTN, whereby only STOP bits (continuous one) are sent, in accordance with the asynchronous transmission principles. Statuses CT107 and CT109 cannot be sent to the MS, and because of the lacking statuses the MS cannot send data.
2) If the status bits are first sent at the call set-up stage within the first few user protocol units, data can be lost due to the integration time of the status bit in the MS TAF (defined in GSM recommendation 07.01). The same can happen when the system is recovering from a failure in the fixed network (between the IWF modem and the PSTN/ISDN modem), if a change of status caused by the failure cannot be signalled to the MS TAF.
3) During the call in situations where no user data is to be sent, there may not be any protocol units in which the changes of status could be transmitted. An example of this is an asynchronous UDI call:
   i) A call is set up, and data transmission is started from the MS to the ISDN. The ISDN terminal equipment TE has no data to send (which means that STOP bits are sent in V.110 frames from the ISDN TE to the MSC IWF). If the ISDN TE wants the MS to stop the transmission momentarily (flow control is activated in the receiver e.g. because the receiving buffer has filled up), the IWF cannot transmit the flow control status contained in bit X from the ISDN V.110 frame to the direction of the MS TAF, since there are no user protocol units in which bit X could be inserted.
4) A call set-down cannot be signalled by status bits, since there are no user protocol units in which status bits could be positioned for transmission (in protocol stack structures, upper layers are switched off first). In direct and dedicated access, where the only signalling is in-band signalling between the IWF and the equipment accessed, the call set-down performed by the latter cannot be signalled as a change of status to the MS TAF, and so the call set-down fails until the control time elapses (abnormal call set-down). Where a V.110 UDI is concerned, normal set-down according to ITU-T V.110 is not possible, since an exchange of statuses is not possible between the MS TAF and ISDN terminal equipment due to the absence of user protocol units.
5) Data transmission is interfered with by disturbances or failure in the fixed network section of the connection (between the IWF modem and the PSTN/ISDN modem), which means that no user protocol data units are sent from the fixed network to the MS TAF. The IWF cannot send a change of CT109 status to the MS TAF to inform it of the status of the modem connection, since there are no user protocol units in which the status bit could be inserted.

In a preferred embodiment of the invention, a general solution to the problem is that the TAF and IWF monitor the absence of user protocol units. If the TAF and/or IWF has received a status change which should be forwarded to the other party and no user protocol units are present, the TAF and/or IWF stop transmitting a stream of insignificant bits, and send auxiliary frames that carry the status bit or bits. The TAF and/or IWF simultaneously monitor the terminal interface (user interface) for any user protocol frames so as to return to operation based on normal user protocol. The receiving party—IWF or TAF—separates the status bits from the auxiliary frames and replaces the auxiliary frames with stuffing bits (insignificant to the user protocol or, if necessary, significant).

Both the TAF and the IWF know what type of auxiliary frames are needed for the data service for which the call is set up. An auxiliary frame can be, for example, an empty or insignificant protocol unit (frame) of the user protocol, or a Protocol unit (frame) defined by the recommendations of the transmission network (e.g. V.110 frame in the GSM), or a modified protocol unit (e.g. a modified and adapted V.110 frame on a 14.4 kbit/s GSM traffic channel), or a new type of frame specifically defined for this purpose.

Figure 9:
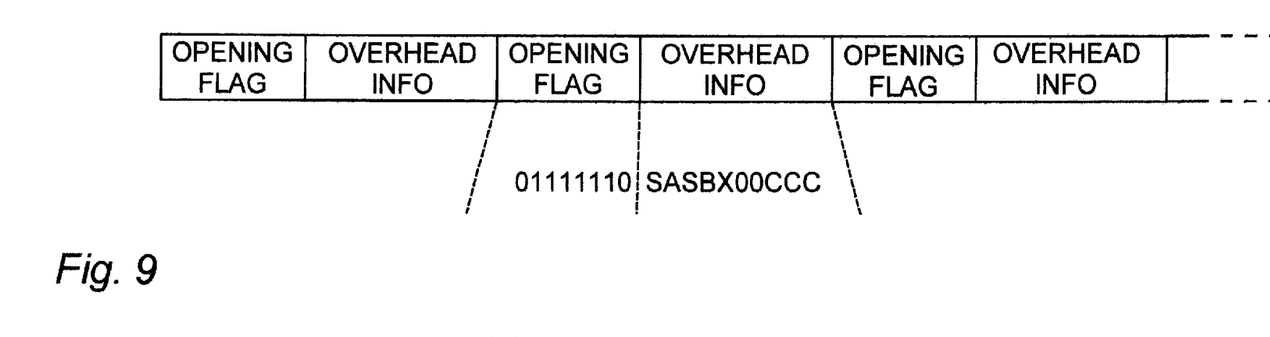
FIG. 9 shows an auxiliary frame according to a preferred embodiment of the invention, useful in connection with the HDLC frame of FIG. 5.

FIG. 9 shows an example of an auxiliary frame in a synchronous case where HDLC-based user data protocol is used. Normally in such a case the HDLC PDU of a radio interface according to FIG. 5 is used. The auxiliary frame of FIG. 9 starts with an opening flag and contains the same overhead information in the redundant address field as is contained in the normal user data transmission in the PDU of FIG. 5. SA, SB and X represent status bits of the terminal interface, and C represents potential other control bits. In a preferred embodiment of the invention, the overhead information field is split by zeros into two parts so as to simplify the synchronization and to avoid addition of zeros, which would be part of the HDLC protocol. In the preferred embodiment, the auxiliary frame does not contain any other fields. In other words, the other fields of FIG. 5, i.e. control, information, frame check sequence and closing flag, are omitted. The receiver can thus easily separate the auxiliary frames from actual user protocol units, since the auxiliary frame is too short to be a protocol unit. On the other hand, synchronization in a receiver is easy, since it is based on a standard HDLC flag (bit pattern 01111110).

Figure 10:
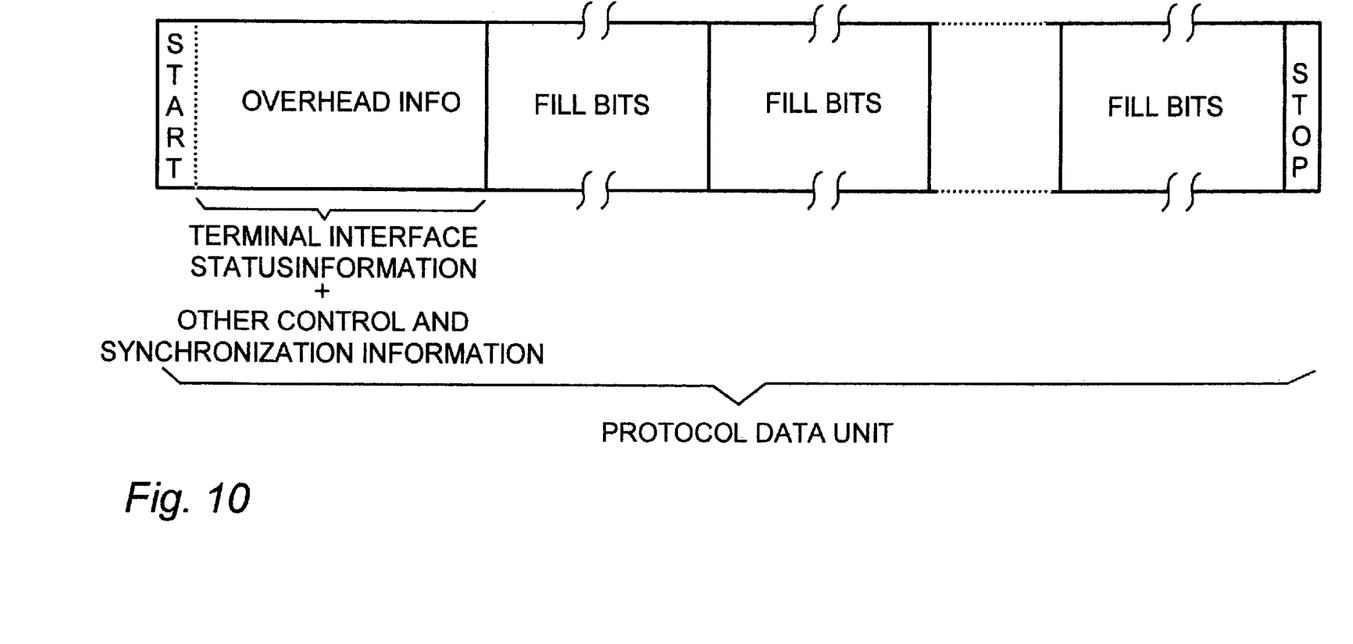
FIG. 10 shows an auxiliary frame according to another preferred embodiment of the invention, useful in connection with the protocol unit of FIG. 8.

FIG. 10 shows an example of a potential auxiliary frame in a transparent asynchronous case where asynchronous characters are transmitted. In the corresponding case in the normal data transmission, 'multicharacter' protocol units according to FIG. 8 were formed by concatenating standard asynchronous characters. The auxiliary frame shown in FIG. 10 comprises START and STOP bits and an OVERHEAD INFO field, like the protocol data unit of FIG. 8. The user data field is here not filled with user data bits (since they do not exist), but with suitable FILL BITS. In a preferred embodiment the fill bits are STOP bits (ones).

In the following we shall describe the use of auxiliary frames according to the invention in some speech situations in the GSM environment.

Call Set-up, 3.1 kHz Modem Services

At first a 14.4 kbit/s traffic channel is synchronized using auxiliary frames for transmitting statuses through the traffic channel. The IWF starts to transmit modem status bits (CT107 and CT109) to the TAF in an auxiliary frame. The IWF monitors a data line coming from the modem to detect a user protocol frame and to switch to operation based on normal user protocol. The IWF identifies a user protocol, e.g. a HDLC frame or an asynchronous character, in the bit stream received from the modem. The IWF continues data transmission in the normal way described in Finnish Patent Applications 955,496 and 955,497.

Call Set-up UDI/V.110

A 14.4 bit/s traffic channel is synchronized using auxiliary frames. The IWF and TAF send the radio interface auxiliary frames in which the statuses have been set to the OFF state, until the frames synchronize with ISDN frames. The IWF synchronizes with an incoming ISDN V.110 frame and starts to send ISDN V.110 status bits (SA, SB and X) to the TAF in the auxiliary frames. The TAF synchronizes with an incoming ISDN V.110 frame and starts to send ISDN V.110 status bits (SA, SB and X) to the IWF in the auxiliary frames. The IWF and TAF monitor the data line coming in from the modem to detect a user protocol frame and to switch to operation based on normal user protocol. The IWF and/or TAF identify a user protocol, e.g. a HDLC frame or an asynchronous character, in the bit stream received from the modem. The IWF and TAF continue data transmission in the normal way described in Finnish Patent Applications 955,496 and 955,497.

No User Protocol Units Available

Let us assume an ongoing asynchronous data transmission from the MS to the ISDN using a V.110 UDI service. The ISDN terminal equipment TE has no data to send (which means that STOP bits are sent in V.110 frames in the direction of the MSC IWF). The IWF detects that no data is received from the ISDN TE, and sends auxiliary frames containing the statuses of the incoming ISDN V.110 frames in the direction of the MS TAF. The ISDN TE wants the MS to interrupt the transmission momentarily (flow control), and indicates this by changing the status of bit V.110 X. The IWF transmits the flow control status of bit X (from ISDN V.110 frame) in the direction of the MS TAF in auxiliary frames. The MS TAF detects the changed status and operates accordingly.

Call Set-down

Let us assume that a data call is set down by a fixed network application. The fixed network application may be an external equipment connected to the MSC IW by a direct and/or dedicated line, or an ISDN terminal equipment or a PSTN/ISDN modem. At first the application stops the transmission of data, sets down the upper protocol layers, and sets the CT statuses in the direction of the MSC IWF in the OFF state. The IWF detects that no more data or user protocol units are received from the external source, and sends the MS TAF auxiliary frames containing incoming terminal interface statuses. A change of status indicating a set-down request is thus transmitted to the MS TAF. The MS TAF detects the change of status and operates accordingly, e.g. sends a set-down status response in an auxiliary frame to the IWF (which forwards the status to the application that has requested the set-down) and/or signals the set-down request to the MSC.

Interruption of Transmission

Let us assume an ongoing data transmission between the MS TAF and the PSTN (through the MSC IWF). A momentary interference or failure on the PSTN connection results in that data transmission between the IWF modem and the PSTN modem fails. The IWF identifies the failure (both on the basis of the loss of synchronization of incoming user protocol frames received from the modem and—probably a little later—on the basis of the modem status CT109 (carrier detect)). The IWF starts to transmit auxiliary frames with modem statuses CT107 and CT109 in the direction of the MS TAF. The MS TAF loses the synchronization of the user protocol received from the IWF, and attempts to re-synchronize both with the user protocol and with the auxiliary frames. The MS TAF succeeds in synchronizing with the auxiliary frames, detects the change of the CT109 status, and continues to operate in accordance with the new status.

The figures and the accompanying description are only intended to illustrate the present invention. The invention may vary in its details within the scope and spirit of the attached claims.

What is claimed is:

1. A data transmission method for transmitting user data and status information of a terminal interface and any other control or synchronization information through a traffic channel or a group of traffic channels in a telecommunication system, characterized by monitoring whether user data elements of end-to-end protocol data units are received at the terminal interface, transmitting the terminal interface status information in redundant data elements of said end-to-end protocol data units through the traffic channel or group of traffic channels when user data elements are received, generating auxiliary frames and transmitting the terminal interface status information in the auxiliary frames when no user data elements are received, separating the terminal interface status information from said redundant data elements or said auxiliary frames at the receiving end, and restoring the original redundancy to the data elements.

2. A method according to claim 1, characterized by transmitting the terminal interface status information in the auxiliary frames in at least one of the following situations: at a call set-up stage before user data transmission is started, during a call set-down after the user data transmission has ended, during a pause in the user data transmission initiated by flow control, and due to failures appearing in sections of an end-to-end connection other than said traffic channel.

3. A method according to claim 1 or 2, characterized in that an auxiliary frame is an empty or insignificant frame according to the end-to-end user protocol data units, a frame defined for a transmission network, a modified frame or a new type of frame allocated for this particular purpose.

4. A method according to claim 1, characterized by transmitting said status information in the address field of an end-to-end transmission protocol supporting point-to-multipoint transmission in a telecommunication system that supports point-to-point transmission.

5. A method according to claim 1, characterized by transmitting said status information in a facsimile service synchronization frame or status frame, or at the end of a facsimile-coded line as stuffing data.

6. A method according to claim 1, characterized by concatenating said terminal interface status information and a number of asynchronous data characters that lack start and stop bits to form a protocol data unit that starts with a start bit and ends with a stop bit, subjecting the protocol data unit to processing actions determined by asynchronous-to-synchronous conversion, transmitting the processed protocol, data unit to the receiving end through said synchronous traffic channel or group of traffic channels.

7. A method according to claim 1, characterized in that said traffic channel is a traffic channel of a mobile system or a satellite system.

8. A transmitting and receiving equipment for transmitting user data and status information of a terminal interface through a traffic channel in a telecommunication system, characterized in that the transmitting equipment (TAF IWF, LES) is arranged to monitor whether user data elements of end-to-end protocol data units are received at the terminal interface, the transmitting equipment (TAF, IWF, LES) is arranged to transmit the terminal interface status information in the redundant data elements of said end-to-end protocol data units through the traffic channel or group of traffic channels when user data elements are received, the transmitting equipment (TAF, IWF, LES) is arranged to generate auxiliary frames and to transmit the terminal interface status information in the auxiliary frames when no user data elements are received, the receiving equipment (TAF, IWF, LES) is arranged to separate the terminal interface status information from said redundant data elements or said auxiliary frames at the receiving end, and to restore the original redundancy to the data elements.

9. A transmitting and receiving equipment according to claim 8, characterized in that the equipment is a terminal adaptation function (TAF) of a mobile station, an interworking function (IWF) of a mobile communications network, or a land earth station (LES) of a satellite system.

10. A transmitting and receiving equipment according to claim 8 or 9, characterized in that the nominal user data rate of the traffic channel, the radio interface rate, and the user data rate of the terminal interface are equal, e.g. 14400 bit/s or 4800 bit/s.

11. A transmitting and receiving equipment according to claim 8, characterized in that the equipment is arranged to transmit the terminal interface status information in the auxiliary frames in at least one of the following situations: at a call set-up stage before user data transmission is started, during a call set-down after the user data transmission has ended, during a pause in the user data transmission initiated by flow control, and due to failures appearing in sections of an end-to-end connection other than said traffic channel.

12. An equipment according to claim 8, characterized in that said redundant data element of the end-to-end protocol data unit comprises at least one of the following: the address field of an end-to-end protocol data unit supporting point-to-multipoint transmission in a telecommunication system that supports point-to-point transmission, a facsimile service synchronization frame, a status frame, and stuffing information at the end of a facsimile-coded line.

13. An equipment according to claim 8, characterized in that said redundant data element of the end-to-end protocol data unit comprises start and stop bits (START, STOP) of asynchronous data characters concatenated to form a single protocol unit.

* * * * *